US007957993B2

(12) United States Patent
MacGregor

(10) Patent No.: US 7,957,993 B2
(45) Date of Patent: Jun. 7, 2011

(54) APPARATUS AND METHOD FOR DETERMINING A VALIDITY INDEX FOR KEY PERFORMANCE INDICATORS

(75) Inventor: John Malcolm MacGregor, Ascot (GB)

(73) Assignee: Business Objects Software Ltd., Dublin (IE)

( * ) Notice: Subject to any disclaimer, the term of this patent is extended or adjusted under 35 U.S.C. 154(b) by 421 days.

(21) Appl. No.: 11/831,949

(22) Filed: Jul. 31, 2007

(65) Prior Publication Data

US 2009/0037238 A1    Feb. 5, 2009

(51) Int. Cl.
*G06Q 10/00* (2006.01)
(52) U.S. Cl. ............................................................. 705/7
(58) Field of Classification Search .................... 705/7
See application file for complete search history.

(56) References Cited

U.S. PATENT DOCUMENTS

| 7,110,988 | B1 * | 9/2006 | Allemann et al. | 706/7 |
| 7,349,862 | B2 * | 3/2008 | Palmer et al. | 705/7 |
| 2002/0049621 | A1 * | 4/2002 | Bruce | 705/7 |
| 2002/0099578 | A1 * | 7/2002 | Eicher et al. | 705/7 |
| 2002/0194042 | A1 * | 12/2002 | Sands | 705/7 |
| 2003/0069773 | A1 * | 4/2003 | Hladik et al. | 705/7 |
| 2003/0182181 | A1 * | 9/2003 | Kirkwood et al. | 705/11 |
| 2003/0187719 | A1 * | 10/2003 | Brocklebank | 705/10 |
| 2004/0102926 | A1 * | 5/2004 | Adendorff et al. | 702/182 |
| 2004/0186762 | A1 * | 9/2004 | Beaven et al. | 705/8 |
| 2005/0071737 | A1 * | 3/2005 | Adendorff et al. | 715/500 |
| 2006/0184409 | A1 * | 8/2006 | Bangel et al. | 705/8 |
| 2006/0235778 | A1 * | 10/2006 | Razvi et al. | 705/35 |

OTHER PUBLICATIONS

Gonzalez, Thomas W.; Dashboard Design: Key Performance Indicators & Metrics; Oct. 7, 2006; Infommersion, Inc.; pp. 1-7.*
Brown, Carol V.; Performance Metrics for IT Human Resource Alignment; Fall 2002; EBSCO Publishing; Information Systems Management—Aligning IT With Business Strategy; pp. 1-8.*
Moran, Atilio; A Study of the Influence of Goal Alignment on Multi-Organizational Projects: A System Dynamics Approach; May 2007; ProQuest Information and Learning Company; pp. 1-354.*
Thompson, Kenneth R., et al.; The Aligned Balanced Scorecard: An Improved Tool for Building High Performance Organizations; 2008; Elsevier; Organizational Dynamics, vol. 37, No. 4; pp. 378-393.*

* cited by examiner

*Primary Examiner* — Susanna M Diaz
*Assistant Examiner* — Ashley Y Chou
(74) *Attorney, Agent, or Firm* — Mintz, Levin, Cohn, Ferris, Glovsky and Popeo, P.C.

(57) ABSTRACT

A computer readable storage medium comprises executable instructions to define and calculate a plurality of performance indicators, including key performance indicators. A validity index for a key performance indicator is determined based on variances of performance indicators that are in conflict with the key performance indicator.

9 Claims, 5 Drawing Sheets

500

| Key Performance Indicator | Period 1 | Period 2 | Period 3 | Period 4 | Period 5 |
|---|---|---|---|---|---|
| The number of outpatients | | | | | |
| Target | 50 | 45 | 45 | 40 | 35 |
| Actual | 52 | 45 | 40 | 32 | 25 |
| 505 — Variance | -2 | 0 | 5 | 8 | 10 |
| Variance % | -2.00% | 0.00% | 5.00% | 9.00% | 10.00% |

| Validity Index Calculation | Period 1 | Period 2 | Period 3 | Period 4 | Period 5 |
|---|---|---|---|---|---|
| 605 — The number of people who become blind | | | | | |
| Target | 5 | 5 | 5 | 5 | 5 |
| Actual | 6 | 9 | 13 | 18 | 25 |
| Variance | -1 | -4 | -8 | -13 | -20 |
| Variance % | -1.00% | -4.00% | -8.00% | -13.00% | -20.00% |
| 610 — The number of people who lose some of their sight | | | | | |
| Target | 10 | 10 | 10 | 10 | 10 |
| Actual | 12 | 14 | 16 | 18 | 20 |
| Variance | -2 | -4 | -6 | -8 | -10 |
| Variance % | -2.00% | -4.00% | -6.00% | -8.00% | -10.00% |
| 615 — Weighting | | | | | |
| The number of people who become blind | 60.00% | 60.00% | 60.00% | 70.00% | 70.00% |
| The number of people who lose some of their sight | 40.00% | 40.00% | 40.00% | 30.00% | 30.00% |
| Total | 100.00% | 100.00% | 100.00% | 100.00% | 100.00% |
| Weighted variance | -1.40% | -4.00% | -7.20% | -11.50% | -17.00% |

| | Period 1 | Period 2 | Period 3 | Period 4 | Period 5 |
|---|---|---|---|---|---|
| Validity Index | 98.6 | 96 | 92.8 | 88.5 | 83 |

FIG. 7

APPARATUS AND METHOD FOR DETERMINING A VALIDITY INDEX FOR KEY PERFORMANCE INDICATORS

BRIEF DESCRIPTION OF THE INVENTION

This invention relates generally to assessing business metrics in a digital data processor. More particularly, this invention relates to techniques to determine a validity index for key performance indicators.

BACKGROUND OF THE INVENTION

Business Intelligence generally refers to a category of software systems and applications used to improve business enterprise decision-making and governance. These software tools provide techniques for analyzing and leveraging enterprise applications and data. They are commonly applied to financial, human resource, marketing, sales, service provision, customer, and supplier analyses. More specifically, Business Intelligence tools can include reporting and analysis tools to analyze, forecast and present information, content delivery infrastructure systems to deliver, store and manage reports and analytics, data warehousing systems to cleanse and consolidate information from disparate sources, integration tools to analyze and generate workflows based on enterprise systems, database management systems to organize, store, retrieve and manage data in databases, and performance management applications to provide business metrics, dashboards, and scorecards, as well as best-practice analysis techniques for gaining business insights.

In many organizations establishing business strategies is an increasingly complex exercise. There are ongoing efforts to supply quantitative tools to enhance business strategy decision making. In particular, there is an increasing focus on performance management applications that provide a quantitative framework for analyzing various business metrics. A business metric is a measure used to evaluate a quantifiable component of an organization's performance. For example, business metrics may include return on investment, revenues, sales volume, inventory levels, cycle times, supply chain costs, number of customers, and so on.

One type of a business metric is characterized as a Key Performance Indicator ("KPI"). A KPI is the measure of performance of an activity that is critical to the success of an organization. KPIs are used in Business Intelligence to assess a business strategy and to prescribe a course of action. The business strategy should have clear goals and performance requirements that are quantifiable.

At any given time, there may be hundreds of KPIs that could be monitored by the organization. Only a small percentage of those will likely drive and impact a given business strategy. Because KPIs directly affect business strategy decision making, they must be carefully selected depending on the nature and objective of an organization.

As an example, consider a retail organization trying to optimize its performance. The retail organization may select various KPIs that measure sales performance and expenses so that it can achieve its objective of maximizing sales and controlling expenses. The KPIs may be customized for each member of an organization to measure performance that is relevant to the responsibilities at that member's level. For example, an accounts receivable associate may have "receivables less than 30 days" as a KPI to ensure the associate's goal fits with the corporate objective of increasing profitability. A distribution associate may have "mispicks" in store distribution routines as a KPI to ensure the associate is working towards the corporate goals of maximizing efficiency and increasing customer satisfaction, both of which also serve to maximize profitability.

With multiple KPIs to monitor across multiple departments and divisions, it is imperative that the organization have tools in place to improve organizational effectiveness. There are a number of commercially available tools that can monitor KPIs and other business metrics in stand-alone performance management applications or packages integrated into the tools. For example, Business Objects Americas of San Jose, Calif., sells a number of widely used Business Intelligence and performance management tools that can monitor KPIs, including Crystal Xcelsius™, BusinessObjects Performance Manager™, BusinessObjects Enterprise™, BusinessObjects XI™, and BusinessObjects Dashboard Builder™, to name a few. These tools include various frameworks for KPI monitoring, including visualization frameworks such as performance dashboards and scoreboards.

Dashboards provide a consistent way to track actual activity and results with benchmarks and thresholds to measure against. With performance dashboards and scoreboards, each employee and department can view the KPIs that are important to them and manage individual targets (i.e., sales by region, cost of sales, profit margin, etc.) so they can improve performance, speed, and effectiveness. Those targets can then be rolled up across functional areas, departments, and business lines to provide high-level views of the organization's performance.

To be effective and successful in its performance management goals, selected KPIs should be consistent across the organization's functional areas, departments and business lines. Lack of consistency in the KPIs monitored for a given business process or strategy may lead to conflict and thus failure in achieving the goals and performance requirements of the organization. In the example above of a retail organization trying to optimize its profits, one retailer may have sales volume as a key indicator for operations, while one of its key merchants may be focused on gross product margin. This leads to conflict, as the operations team may want to reduce price as one method of driving sales volume, but this price reduction will by definition reduce the gross margin percent of the sale.

Managing KPI conflict is therefore critical to an organization's success. KPIs should be selected and monitored by clearly identifying the cause-and-effect relationships that need to be managed for the best overall performance. When conflicting KPIs are monitored in isolation without a clear sense of whether they support the achievement of the overall performance goals, targets may be missed, resources allocated improperly, and operational efficiency may be less than ideal.

Currently-available performance management tools allow users to measure, visualize, and analyze KPIs. However, they do not rigorously examine the relationships between KPIs and the overall organizational strategy. There is no performance management tool available today that offers users the capability to treat KPIs as a whole and provides a quantifiable measure to track possible undesirable outcomes. That is, there is no performance management tool available today that provides a mechanism to identify and rationalize conflicting KPIs. As a result, an organization may be required to devote considerable resources analyzing KPIs to determine any conflicts that may detract the organization from achieving its performance goals.

Accordingly, it would be desirable to provide techniques to address the shortcomings of existing performance management tools. In particular, it would be desirable to provide a technique to ensure that a given KPI is aligned with the organization's overall performance goals.

SUMMARY OF THE INVENTION

The invention includes a computer readable medium with executable instructions to define and calculate a plurality of performance indicators. A validity index is determined for a performance indicator from the plurality of performance indicators.

The invention also includes a computer readable medium with executable instructions for identifying a plurality of performance indicators that are in conflict with a key performance indicator. The variances of the plurality of performance indicators in conflict with the key performance indicator are calculated to determine the validity index for the key performance indicator.

BRIEF DESCRIPTION OF THE DRAWINGS

The invention is more fully appreciated in connection with the following detailed description taken in conjunction with the accompanying drawings, in which like reference characters refer to like parts throughout, and in which:

FIG. 5 illustrates an exemplary data table for a key performance indicator processed in accordance to an embodiment of the invention;

FIG. 6 illustrates an exemplary data table for performance indicators in conflict with the key performance indicator of FIG. 5 that is processed in accordance to an embodiment of the invention; and FIG. 7 illustrates an exemplary data table showing a validity index for the key performance indicator of FIG. 5 according to an embodiment of the invention.

DETAILED DESCRIPTION OF THE INVENTION

Figure 1:
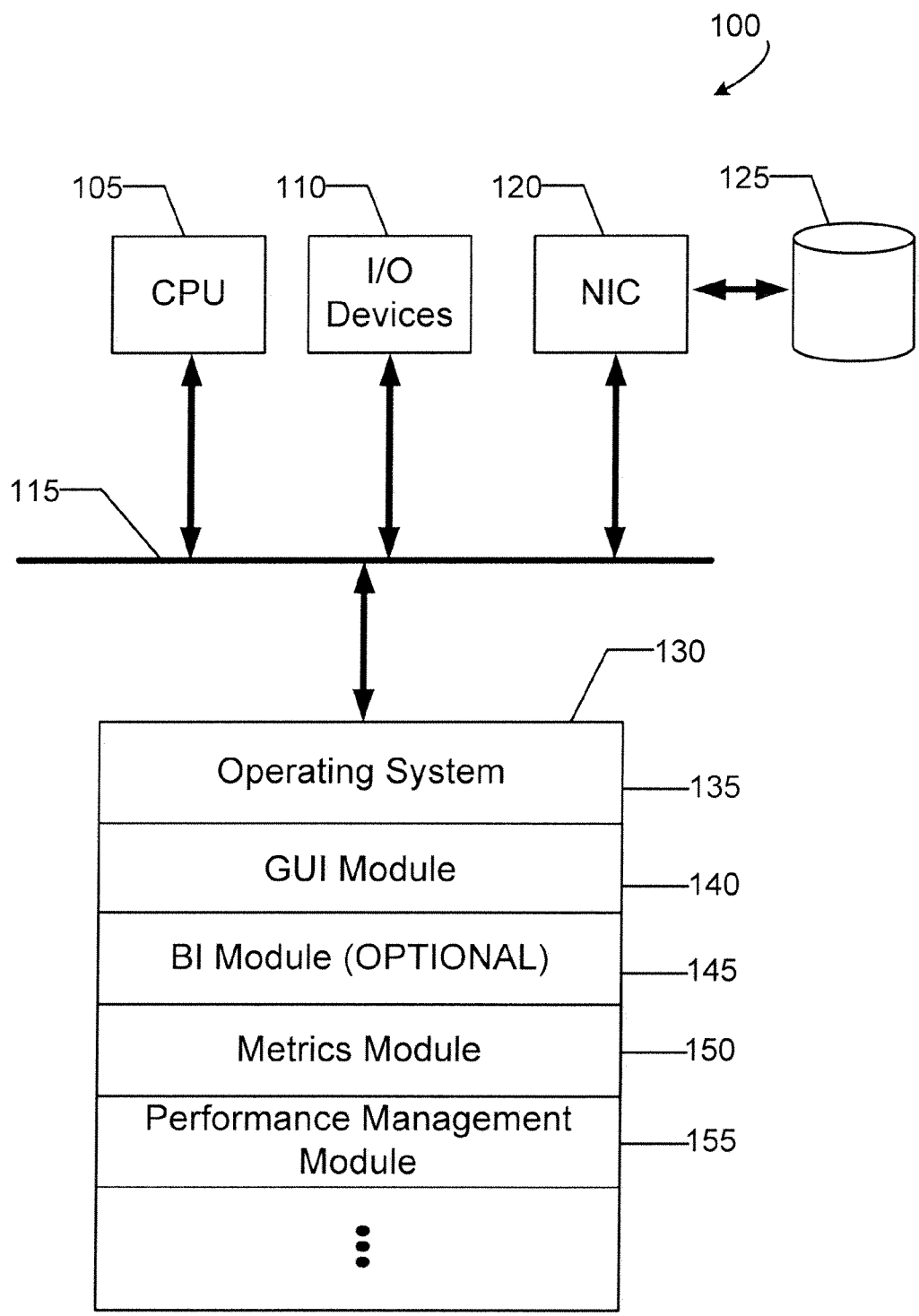
FIG. 1 illustrates a computer constructed in accordance with an embodiment of the invention.

The present invention provides a system, method, software arrangement, and computer readable storage medium for determining a validity index for a key performance indicator. As generally used herein, a performance indicator or business metric may be a measure used to evaluate a quantifiable component of an organization's performance. For example, performance indicators may include return on investment, revenues, sales volume, inventory levels, cycle times, supply chain costs, number of customers, and so on. A key performance indicator ("KPI") may be a measure of performance of an activity that is critical to the success of the organization.

According to the present invention, a validity index for a KPI is calculated by first determining performance indicators that are in harmony or in conflict with the KPI. Performance indicators that are in harmony with the KPI, referred generally herein as "Harmony-KPIs," may be those performance indicators that are aligned with the overall performance goal measured by the KPI. Conversely, performance indicators that are in conflict with the KPI, referred generally herein as "Anti-KPIs," may be those performance indicators that are in conflict with the overall performance goal measured by the KPI.

As an example, consider an organization trying to promote a new product. The marketing, merchandising, and operations departments of the organization must all work together to achieve a successful product promotion. In the course of promoting the product, each one of these departments identify and monitor KPIs to quantify the success of the promotion. The promotion will most likely fail if the KPIs being monitored are in conflict, that is, if the KPIs being monitored are not linked or aligned to the general corporate objective of a successful product promotion. For example, the product promotion is likely to fail if marketing's goal is to increase a "sales volume" KPI, merchandising is focused on a "gross margin" KPI and wants to stock only limited quantities of the advertised product because of its low margin, and operations is trying to save on labor by reducing the "time spent on tagging the promotion product" KPI, thereby not appropriately signing the promoted merchandise.

In another example, consider a recruiting branch of a human resources department in an organization trying to fill vacancies in a research and development department. The human resources department may have recruiting targets such as a target to fill all the vacancies in the current quarter, a target to conduct an internal search for candidates within the organization before advertising the positions outside the organization, and a target to find candidates that only have 10 or more years of experience. If the human resources department is focusing on its timing targets KPIs, it may not achieve its goal of finding the best candidates for the position.

In yet another example, consider a police force trying to reduce crime in a certain neighborhood. The police force may have as one of its goals to meet or exceed government targets for number of arrests. If the police force spends considerable resources in making trivial arrests to bolster its government targets, it may lose track of crime prevention and other measures that may aid in its overall goal of crime reduction.

The above examples illustrate the need to ensure that KPIs affecting a given performance goal are not treated in isolation. An individual KPI to be monitored can be considered to belong to a set of KPIs sharing the commonality that an organization's resources used to affect that KPI also affect that whole set of KPIs. The sharing of resource identifies a set of common KPIs. In this set, some KPIs may be Harmony-KPIs and some may be Anti-KPIs.

The measure of success or failure in meeting the target values of a KPI is the variance between the actual value and the target value. The variance for the KPI is calculated and monitored through different time periods. In each time period, a weighted variance of the Anti-KPIs is also calculated.

In one exemplary embodiment, the validity index for the KPI to be monitored is computed based on the weighted variance of the Anti-KPIs. The validity index indicates whether the KPI to be monitored is being influenced by the performance of the Anti-KPIs. A low validity index for a given KPI suggests that Anti-KPIs are driving down the overall performance goal tracked by the KPI. A low validity index may be a validity index below a threshold specified by the organization. The threshold may be determined on a case-by-case basis.

Advantageously, the present invention allows an organization to validate that a given KPI is aligned with the organization's overall performance goals. The present invention also allows users of performance management applications to identify the Anti-KPIs that are mostly contributing to the validity of the given KPI.

FIG. 1 illustrates a computer configured in accordance with an embodiment of the invention. Computer 100 includes standard components, including a Central Processing Unit ("CPU") 105 and input/output devices 110, which are linked by a bus 115. Input/output devices 110 may include a keyboard, mouse, touch screen, monitor, printer, and the like.

Network Interface Circuit ("NIC") 120 may also be connected to the bus 115. NIC 120 provides connectivity to a network (not shown), thereby allowing computer 100 to operate in a networked environment. For example, networked data sources 125 are connected to computer 100 through NIC 120. In accordance with the present invention, networked data sources 125 may include any number and type of data sources, such as, for example, OLAP, OLTP and relational databases, among others.

Memory 130 is also connected to the bus 115. In one exemplary embodiment, memory 130 stores one or more of the following modules: an operating system module 135, an optional Graphical User Interface ("GUI") module 140, a Business Intelligence ("BI") module 145, a Metrics module 150, and a Performance Management module 155.

Operating system module 135 may include instructions for handling various system services, such as file services or for performing hardware dependant tasks. The optional GUI module 140 may rely upon standard techniques to produce graphical components of a user interface, e.g., windows, icons, buttons, menu and the like, examples of which are discussed below.

BI module 145 includes executable instructions to perform BI-related functions, such as, performing abstract queries and analyses, producing reports, accessing data sources such as relational and/or multidimensional databases, accessing document storage repositories, and the like.

In accordance with the present invention, Metrics module 150 includes executable instructions for creating and defining performance indicators, including KPIs. Performance Management module 155 includes executable instructions for monitoring the business metrics and performance indicators calculated by Metrics Module 150.

Performance Management module 155 also includes executable instructions to generate scoreboards, dashboards, and other performance indicator visualization applications or documents. In accordance with an embodiment of the invention, Performance Management module 155 further includes executable instructions for identifying Harmony-KPIs and Anti-KPIs for a given KPI as well as executable instructions for calculating a validity index for the given KPI.

It should be appreciated that the executable modules stored in memory 130 are exemplary. It should also be appreciated that the functions of the modules may be combined. In addition, the functions of the modules need not be performed on a single machine. Instead, the functions may be distributed across a network, if desired. Indeed, the invention may be commonly implemented in a client-server environment with various components being implemented at the client-side and or the server-side. As understood by those of ordinary skill in the art, it is the functions of the invention that are significant, not where they are performed or the specific manner in which they are performed.

Figure 2:
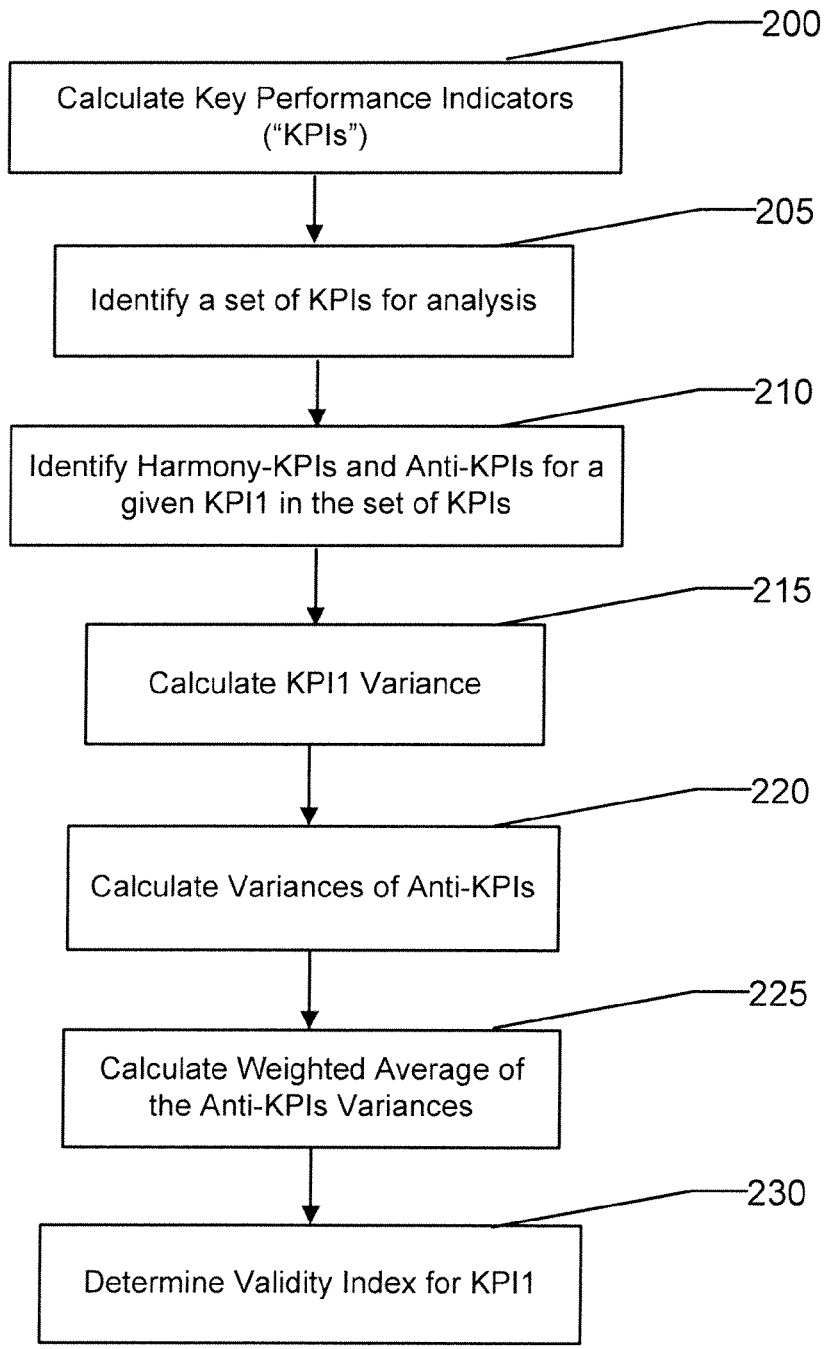
FIG. 2 illustrates a flow chart for determining a validity index for a key performance indicator in accordance with an embodiment of the invention.

Referring now to FIG. 2, a flow chart for determining a validity index for a key performance indicator in accordance with an embodiment of the invention is described. The operations of FIG. 2 may be implemented using Metrics module 150 and Performance Management module 155 either independently or in conjunction with GUI module 140. Initially, Metrics module 150 calculates a plurality of KPIs that measure various performance targets for an organization (200).

A set of KPIs desired to be monitored by the organization is then identified for analysis (205). This set can include KPIs that impact one or more business strategies. In general, for a $KPI_{ij}$ where i=1 being the individual $KPI_1$ for periods j=1 to n, we have the set of KPIs $\{KPI_{ij},$ for i=2 to m KPIs, for periods j=1 to n$\}$ which share resources with the individual $KPI_1$.

Each KPI for i=2 to m, is then classified into a Harmony-KPI or an Anti-KPI (210). The Harmony-KPIs and Anti-KPIs may be manually identified by a user or by one or more BI and Performance Management modules that track business processes and strategies for the organization, such as BI module 145 and Performance Management module 155. In one exemplary embodiment, Harmony-KPIs and Anti-KPIs may be identified by analyzing previous performance for those KPIs or by analyzing dashboards and scoreboards for various KPIs tracked by the organization. Other user-defined and custom-based approaches may also be employed to identify Harmony-KPIs and Anti-KPIs.

The percentage variance of actual and target values for the individual $KPI_1$ is then calculated and monitored (215). The percentage variance for a given individual $KPI_i$ may be expressed as:

$$\text{Variance} = (Act_{ij} - Tar_{ij})\% \quad (1)$$

where $Act_{ij}$ and $Tar_{ij}$ are the actual and target values of $KPI_i$ in period j, respectively.

Similarly, the percentage variances of actual and target values for each Anti-KPI in conflict with the individual $KPI_1$ are also calculated (220). The percentage variances for each Anti-KPI in conflict with the individual $KPI_1$ are then multiplied by a series of weights $W_{ij}$, where i=2 to m Anti-KPIs for the periods j=1 to n, to determine a weighted average of the variances of the Anti-KPIs in conflict with the individual $KPI_1$ (225). In one exemplary embodiment, the weights $W_{ij}$ are selected by a user to reflect the importance of each Anti-KPI in impacting the overall performance goals of the organization.

Applying the weighted average of the Anti-KPIs variances to a value of 100 results in a numeric value for a validity index for the individual $KPI_1$ identified for analysis (230). In general, the validity index for an individual $KPI_1$ may be expressed as:

$$\text{Validity Index} = 100 \times \left( \left( \sum_{i=2}^{m} W_{ij}(Act_{ij} - Tar_{ij}) \% \; Act_{ij} \right) + 1 \right) \quad (2)$$

The validity index for the individual $KPI_1$ therefore gives a measure of how well $KPI_1$ is capturing the performance goal for the organization that it is meant to measure. Any validity index below 100 should be highlighted by an organization's manager as an indication that the performance goal measured by $KPI_1$ may be off-track. In one exemplary embodiment, threshold levels can be assigned to provide alerts for the validity index, for example, when the validity index falls below 100, 90, 80, and so on.

Figure 3:
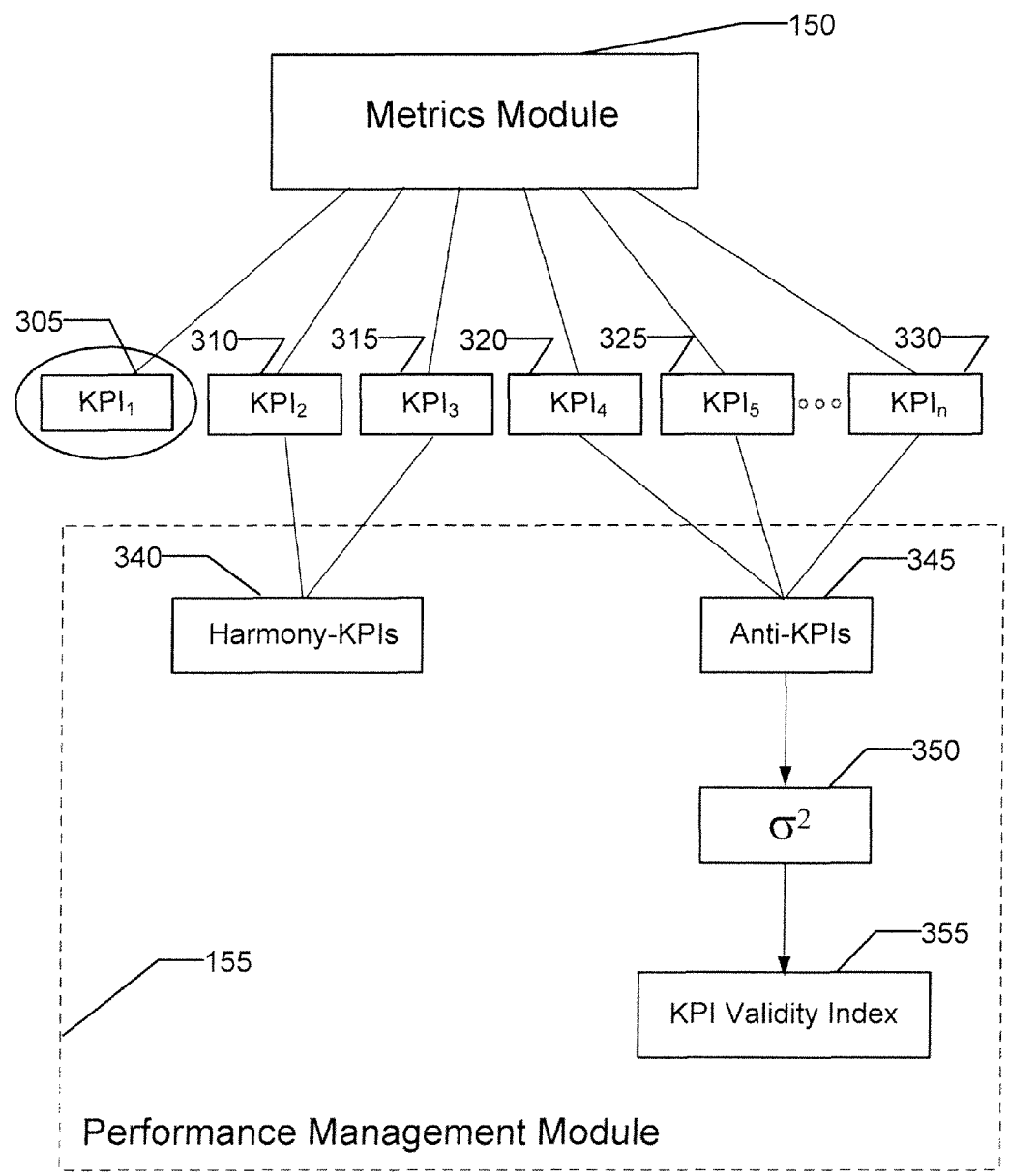
FIG. 3 illustrates an architecture for implementing the operations of FIG. 2 according to an embodiment of the invention.

Referring now to FIG. 3, an architecture for implementing the operations of FIG. 2 according to an embodiment of the invention is described. Metrics Module 150 calculates a set of KPIs including $KPI_1$ 305, $KPI_2$ 310, $KPI_3$ 315, $KPI_4$ 320, $KPI_5$ 325, up to $KPI_m$ 330. The set of KPIs identified by $\{KPI_i,$ for i=1 to m$\}$, forms a set of common KPIs. The common KPIs in the set are all affected by the same organization's resources and can be said to measure values that drive one or more performance goals for the organization.

At any given time, the organization may want to focus on one of the KPIs in the set. For example, the organization may want to monitor a given KPI more closely to determine how well it is reflecting the performance goal that the KPI is measuring. Alternatively, the organization may want to determine how well all the KPIs in the set are tracking the overall performance goals they are measuring. Performance Management module 155 may be used to generate various dashboards, scoreboards, and analytics to aid in the organization's analysis. In particular, Performance Management module 155 may be used to determine a validity index for each KPI in the set.

Accordingly, a validity index may be calculated for each KPI in the set in accordance with the operations described herein above with reference to FIG. 2. For $KPI_1$ 305, for example, the validity index is determined by first identifying $KPI_2$ 310 and $KPI_3$ 315 as Harmony-KPIs 340 and by identifying $KPI_4$ 320 and $KPI_5$ 325 as Anti-KPIs 345. The variances of the Anti-KPIs 345 is then calculated (350) and their weighted average is computed to determine the validity index for $KPI_1$ 305 (355).

It is appreciated that the organization may want to monitor all relationships between the KPIs in a set of common KPIs, including the relationships between the KPIs that are in harmony with a given KPI in the set. For example, the organization may want to identify all the KPIs that are Harmony-KPIs with a given KPI while in conflict with each other.

Consider the example above where $KPI_2$ 310 and $KPI_3$ 315 are in harmony with $KPI_1$ 305. Even though $KPI_2$ 310 and $KPI_3$ 315 are in harmony with $KPI_1$ 305, $KPI_2$ 310 and $KPI_3$ 315 could be in conflict with each other. Because their conflicting relationship could ultimately affect the performance goal measured by $KPI_1$ 305, the organization may want to monitor the variances of $KPI_2$ 310 and $KPI_3$ 315 to determine their effect on the validity index of $KPI_1$ 305. The organization may also want to calculate a validity index for each one of $KPI_2$ 310 and $KPI_3$ 315 independently to evaluate how well these KPIs are tracking their corresponding performance goals.

It is thus appreciated that Performance Management module 155 can be used to determine all the relationships between the KPIs in a given set of common KPIs and suggest which KPIs should be included in the computation of a validity index for a given KPI in the set. These KPIs may include the Anti-KPIs as well as Harmony-KPIs that may have conflicting relationships with each other. They may also include any KPI desired to be monitored by the organization as a potential influence on a given KPI. In doing so, Performance Management module 155 may also be used to indicate which weights to be applied to each variance in determining the validity index for a given KPI.

Figure 4:
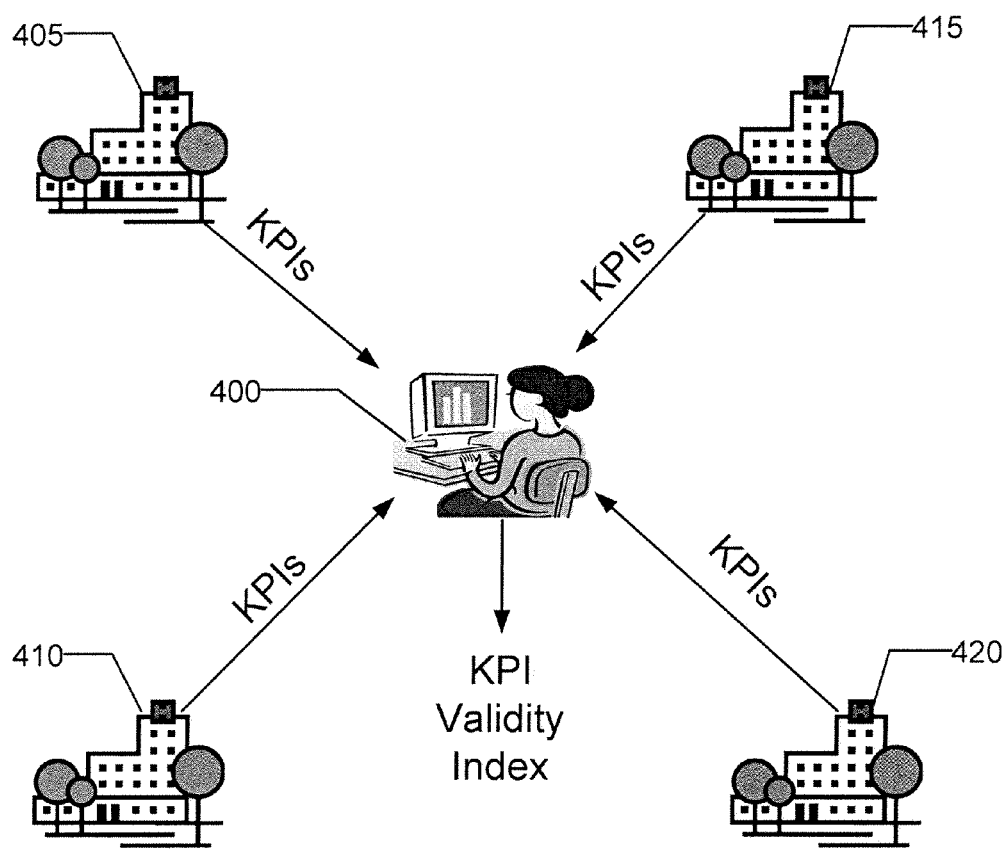
FIG. 4 illustrates an exemplary environment in which the invention operates.

An exemplary environment in which the invention operates is illustrated in FIG. 4. A manager of a health-based organization 400 is analyzing its outpatient targets at various clinics, such as clinics 405-420. In accordance with the present invention, the number of outpatients tracked by the organization is not tracked in isolation, but rather, it is tracked in conjunction with other KPIs that may affect the overall performance goals of the health-based organization.

For example, for patients visiting clinics 405-420 with various ophthalmologic conditions, it is important to keep the number of outpatients under control and in check with follow-up conditions that can be avoided if the patients stay overnight, such as patients going blind or losing some of their sight as a result of not receiving the appropriate care.

Manager 400 may then calculate a validity index for the number of outpatients in light of the number of patients that went blind or lost some of their sight during a given time period. Doing that will prevent the organization from focusing on the number of outpatients in isolation without losing track of its overall goal of providing the best possible care in its clinics 405-420.

FIG. 5 illustrates an exemplary data table for the "number of outpatients" KPI. Data table 500 shows the target and actual values for the "number of outpatients" KPI during time periods 1-5. The difference between the target and actual values at each time period is computed as the KPI variance. Percentage variance 505 shows the percentage variance in each time period.

It is appreciated that the percentage variance 505 may be considered small by a manager of the organization. The small percentage variance 505 may be an indication that the KPI is aligned with the performance goal of the organization during each time period. A validity index for the KPI can be computed to ensure that is indeed the case.

To compute the validity index, the Anti-KPIs that conflict with the "number of outpatients" KPI need to be identified. In the example shown in FIG. 4, these Anti-KPIs may include, for example, a "number of people who become blind" KPI and a "number of people who lose some of their sight" KPI. These Anti-KPIs can be monitored to evaluate whether the "number of outpatients" KPI is aligned with the overall performance goals of the organization. As discussed above, if outpatients are being sent home prematurely and eventually lose their sight or become blind, it could be an indication that the "number of outpatients" KPI is too high. Computing the validity index for the "number of outpatients" KPI serves to substantiate the organization's strategy.

An exemplary data table showing actual and target values and corresponding variances and percentage variances for these Anti-KPIs is shown in FIG. 6. Data table 600 shows the actual and target values and corresponding variances and percentage variances for the "number of people who become blind" Anti-KPI 605 and the "number of people who lose some of their sight" Anti-KPI 610.

As described above with reference to FIG. 2, weights can be assigned to the Anti-KPIs to determine a weighted variance. The weights can be assigned by the organization on a case-by-case basis according to the importance of each Anti-KPI in influencing the individual KPI. In this case, a higher weight of 60% may be assigned to the "number of people who become blind" Anti-KPI and a lower weight of 40% may be assigned to the "number of people who lose their sight" Anti-KPI. A higher weight is assigned to the "number of people who become blind" Anti-KPI because it provides a stronger indication that the patients who became blind were sent home prematurely by the clinic.

Applying the weights to the variances for the Anti-KPIs results in weighted variances 615 for each one of the periods. As shown in data table 600, weighted variances 615 are at their highest during period 5, when 25 patients became blind and 20 patients lost some of their sight.

The validity index for the "number of outpatients" KPI is shown in FIG. 7. The validity indexes for each one of the time periods may be computed by transforming the weighted variances 615 to a base of 100. As shown in data table 700, the validity index for the "number of outpatients" KPI is at its highest during period 5.

The organization may assign threshold levels to provide alerts for the validity index, for example, when the validity index falls below 100, 90, 80, and so on. In this case, a validity index of 83 in period 5 may be below a threshold thereby triggering an alert. The alert suggests to the organization that its overall strategy for its number of outpatients may have to be revised.

It is appreciated that these threshold levels may be adjusted by the organization as needed to reflect different performance goals. It is also appreciated that any number of Anti-KPIs may be considered as appropriate when validating a given KPI.

In one exemplary embodiment, the present invention relates to a computer storage product with a computer-readable medium having computer code thereon for performing various computer-implemented operations for determining a validity index for key performance indicators. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another exemplary embodiment of the invention may be implemented in hard-wired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

What is claimed is:

1. A computer readable storage medium, comprising executable instructions to:

define and calculate a plurality of performance indicators, wherein each of the performance indicators is a measure of performance;

monitor the plurality of performance indicators by calculating a variance between an actual value and a target value for each performance indicator of the plurality of performance indicators;

designate a selected performance indicator from the plurality of performance indicators for further analysis;

identify a set of performance indicators from the plurality of performance indicators that influence the selected performance indicator, wherein the set of performance indicators comprises a first subset of performance indicators that are determined to be in conflict with the selected performance indicator and a second subset of performance indicators that are determined to be in harmony with the selected performance indicator, wherein the performance indicators determined to be in harmony with the selected performance indicator comprise performance indicators determined to have conflicting relationships with each other; and determine a validity index for the selected performance indicator based on the set of performance indicators, wherein the validity index indicates influence upon the selected performance indicator.

2. The computer readable storage medium of claim 1, wherein the plurality of performance indicators comprises key performance indicators.

3. The computer readable storage medium of claim 1, wherein the set of performance indicators and the selected performance indicator form a set of common performance indicators that are influenced by common organization resources and that drive one or more performance goals for a business organization.

4. The computer readable storage medium of claim 1, further comprising executable instructions for calculating a weighted average of the variances of the performance indicators determined to be in conflict with the selected performance indicator and the variances of the performance indicators determined to be in harmony with the selected performance indicator but determined to have conflicting relationships with each other.

5. The computer readable storage medium of claim 4, further comprising executable instructions for calculating the validity index based on the weighted average of the variances.

6. The computer readable storage medium of claim 1, further comprising executable instructions to determine conflicting relationships between the performance indicators within the set of performance indicators.

7. The computer readable storage medium of claim 1, further comprising executable instructions to suggest the set of performance indicators for the determination of the validity index.

8. The computer readable storage medium of claim 1, further comprising executable instructions to provide alerts for the validity index based on an assigned threshold level.

9. The computer readable storage medium of claim 1, wherein the first subset of performance indicators and the second subset of performance indicators are determined by analyzing previous performance for the plurality of performance indicators.

* * * * *